United States Patent [19]

Muendlein et al.

[11] Patent Number: 5,137,401
[45] Date of Patent: Aug. 11, 1992

[54] DEVICE FOR CONNECTING TWO TOOL PARTS

[75] Inventors: Werner Muendlein, Bietigheim-Bissingen; Gerhard Scheer, Loechgau; Gerhard Stolz, Ingersheim, all of Fed. Rep. of Germany

[73] Assignee: Komet Stahlhalter- und Werkzeugfabrik Robert Breuning GmbH, Besigheim, Fed. Rep. of Germany

[21] Appl. No.: 764,125

[22] Filed: Sep. 25, 1991

Related U.S. Application Data

[63] Continuation of Ser. No. 711,123, Jun. 5, 1991, abandoned, which is a continuation-in-part of Ser. No. 581,284, Sep. 12, 1990, abandoned, which is a continuation of Ser. No. 498,036, Mar. 23, 1990, Pat. No. 4,976,574.

[30] Foreign Application Priority Data

Sep. 8, 1989 [DE] Fed. Rep. of Germany ....... 3929976

[51] Int. Cl.⁵ ..................... B23B 29/26; B25G 3/20
[52] U.S. Cl. .................... 409/232; 403/374; 403/379; 408/239 R
[58] Field of Search ............. 409/232, 233, 234; 408/239 A, 239 R, 238; 82/159; 403/324, 362, 379; 279/9 R, 83

[56] References Cited

U.S. PATENT DOCUMENTS

| | | | |
|---|---|---|---|
| 4,617,848 | 10/1986 | Eckle et al. | 82/159 |
| 4,714,390 | 12/1987 | Eckle et al. | 409/234 |
| 4,755,077 | 7/1988 | Eckle | 403/374 |
| 4,797,041 | 1/1989 | Glaser | 409/232 |
| 4,863,323 | 9/1989 | Glaser | 409/232 |
| 4,913,607 | 4/1990 | Von Haas | 409/234 |
| 4,979,845 | 12/1990 | Scheer et al. | 403/379 |

FOREIGN PATENT DOCUMENTS

| | | | |
|---|---|---|---|
| 123220 | 10/1984 | European Pat. Off. | 279/1 ME |
| 0145985 | 6/1985 | European Pat. Off. | |
| 281760 | 9/1988 | European Pat. Off. | 279/9 R |
| 3734052 | 4/1989 | Fed. Rep. of Germany | |
| 280061 | 6/1990 | German Democratic Rep. | 409/234 |

*Primary Examiner*—William Briggs
*Attorney, Agent, or Firm*—Flynn, Thiel, Boutell & Tanis

[57] ABSTRACT

A device for connecting two tool parts having a common axis. The device includes a fitting pin projecting axially from the first tool part and a connecting sleeve projecting from the second tool part and having a mating bore for receiving the fitting pin. A tightening mechanism equipped with a tightening bolt movable in a crossbore of the fitting point assures a sufficient planar surface to planar surface tightening between the two tool parts. Aside from the tightening in direction of the tightening bolt, a clamping of the fitting pin into the mating bore of the connecting sleeve is achieved through suitable measures, the clamping extending transversely with respect to the tightening-bolt direction and resulting in an automatic centering of the tool parts with respect to their common axis and in a reinforcement of the connection transversely with respect to the tightening-bolt axis.

18 Claims, 5 Drawing Sheets

DEVICE FOR CONNECTING TWO TOOL PARTS

This application is a continuation of U.S. Ser. No. 07/711,123, filed June 5, 1991, abandoned, which was a continuation-in-part of U.S. Ser. No. 07/481,284, filed Sept. 12, 1990, abandoned, which was a continuation of U.S. Ser. No. 07/493,036, filed Mar. 23, 1990 U.S. Pat. No. 4,976,574.

FIELD OF THE INVENTION

The invention relates to a device for connecting two tool parts having a common axis, in particular an axis of rotation, comprising a fitting pin axially projecting from the first tool part, comprising an annular end face surrounding the fitting pin at its root, comprising a connecting sleeve axially projecting from the second tool part and which has a mating bore to receive the fitting pin and a ringlike end face which can be pressed against the annular end face, comprising a one-part or multi-part tightening bolt movable in a crossbore of the fitting pin and, if desired, arranged rotatably about its axis, having an internal or external cone or a sloped cam surface at its ends, and comprising two retaining screws guided in diametrically opposed internally threaded openings in the connecting sleeve, having an internal or internal cone or a sloped cam extending toward the inside of the sleeve and corresponding with the internal or external cone or the sloped cam surface of the tightening bolt, which cone or cam surfaces are wedged during the tightening operation with the tightening bolt, the axes of the tightening bolt and the retaining screws being offset or misaligned so as to cause during the tightening operation a pulling of the fitting pin into the mating bore and the mutual pressing of the annular end face and of the ringlike end face together.

BACKGROUND OF THE INVENTION

A device of this type is known (GB-A 2094191), in which the tightening bolt is designed as a one-piece connecting bolt, the one end of which can be constructed as an internal cone and the other end of which can be constructed as an external cone. The tightening operation is started in this device by screwing in the retaining screw (tightening screw) provided with an external cone. When, during screwing in of the tightening screw, abutment occurs, then the forces started by the screw occur first on the side of the tightening screw on the tightening bolt. The tightening bolt is thereby first pressed on the side of the tightening screw against the base surface of the crossbore, which base surface faces away from the end of the fitting pin, such that the fitting pin is pulled into the mating bore. This also takes place directly thereafter during an engagement of the external cone on the tightening bolt with the internal cone on the oppositely positioned retaining screw. As soon as a specific tightening action exists, a complete change of the radial forces into an axial component occurs causing a pressing of the annular end face of the fitting pin and the ringlike end face of the connecting sleeve against one another. This type of tightening results preferably in a reinforcement of the connecting device in direction of the tightening bolt. The torsion forces occurring during a machining operation cause an abutting of the internal and external cones which are adjacent to one another, which abutting is made possible mainly by the tightening bolt being able to carry out a small rotation about its own axis. The tightening between the annular end face and the ringlike end face is thus increased and also the connection is enhanced. Furthermore, the abutting effect results in a nonharmonic vibrating behavior in the connecting area with the result that the frequency of the system is shifted in dependency of the torsion moment and a possibly occurring torsional vibration is therefore dampened.

Furthermore it is known in a device of the above type to design the tightening bolt in two parts and to start the tightening operation with a sliding cam arranged between the two tightening-bolt parts and axially operable through a feeding device arranged on the side of the machine (V-drive) A tightening of the tightening bolts provided with an external cone and of the retaining screws provided with an internal cone and arranged in internally threaded openings of the connecting sleeve takes here also place during the tightening operation. The connecting device is reinforced here also preferably in direction of the tightening bolts.

The basic purpose of the invention is to improve the connecting device of the above-disclosed type, such that the stiffness or rigidity transversely to the tightening-bolt axis is increased, and the changing precision and the damping behavior are improved.

The invention is based on the thought that a four-point contact is provided between the fitting pin and the mating bore in two directions which are perpendicular to one another, as well as an alignment, which is exactly centered taking into consideration the movability of the tightening bolt, and thus a high degree of changing precision is guaranteed. In addition, a reinforcement of the connecting device in two bending directions, which are perpendicular to one another, results.

In order to achieve this, it is suggested, according to a first embodiment of the invention, that the connecting sleeve be widened elastically in axial direction of the tightening bolt during the tightening operation such that it is pressed in transverse direction hereto during an elastic diameter reduction in diametrically opposed areas with the inner surface of the mating bore against the outer surface of the fitting pin. By suitably selecting the wall thicknesses and the external and internal tolerances of the fitting pin and of the mating bore, a four-point contact is thus obtained with the above-described advantages of an increased stiffness transversely with respect to the tightening-bolt direction and an improved self-centering and changing preciseness. This effect furthermore improves the vibrating behavior of the connecting system during bending and torsional vibrations.

Alternatively and in connection with the above solution characteristics, it is suggested according to a further embodiment of the invention that the crossbore provided in the fitting pin have a recess in the area of its base surface facing away from the end of the pin, which recess extends over the length of the crossbore and forms at its longitudinal edges a contact surface for the tightened-in tightening bolt. It is achieved with this measure that the fitting pin during the tightening operation does not rest on the base surface facing away from the end of the pin but on two contact lines on the surface of the crossbore, which contact lines are laterally offset with respect to the base surface of the bore. A radial force component is in this manner during the tightening operation applied by the tightening bolt, aside from the force component acting in axial direction of the fitting pin, onto the fitting pin, which radial force component radially elastically widens the fitting pin by some microns (μ's) This widening bridges the clearance transversely with respect to the tightening-bolt direction and thus results also in a self-centering four-point contact with the above-discussed advantages. In addition, the possibly disadvantageous elastic deformation of the connecting sleeve is at least partly reversed or becomes unnecessary.

According to an advantageous further development of the invention, the recess is formed by a bore, which is eccentric in a direction toward the end of the pin compared with the crossbore and which has a smaller diameter compared with the crossbore. It is basically also possible to form the recess through an oval deformation of the crossbore, which oval deformation is elongated toward the end of the pin.

It has been proven to be particularly advantageous when the edges of the recess around the axis of the crossbore define an angle of ±40° to ±50° with respect to the sides of the base surface of the bore.

A further advantage of this measure is that the tightening bolt experiences an additional tightening and reinforcement within the crossbore so that an improved torque transfer during the machining operation is guaranteed.

Alternatively and in connection with the above solution measures, it is suggested according to the invention that the fitting pin has a notch extending over the length of the crossbore, which notch opens toward the inside of the crossbore. The notch can thereby be arranged in the area of the base surface of the crossbore which faces away from the free end of the pin and/or the root of the pin. This notch results during the tightening operation in an expansion of the crossbore and thus in an enhanced bulging of the fitting pin and in the desired self-centering of the four-point contact. The depth of the notch should thereby be a multiple of the wall thickness between the base of the notch and the end of the pin. If necessary, the notch can also be designed as a slot going through to the end of the pin. The width of the notch should be chosen as small a possible. In order to avoid accumulations of dirt in the notch area, the notch can be filled with an elastomer material.

BRIEF DESCRIPTION OF THE DRAWINGS

The invention will be discussed in greater detail hereinafter in connection with the exemplary embodiments schematically illustrated in the drawings, in which.

DETAILED DESCRIPTION

Figure 1:
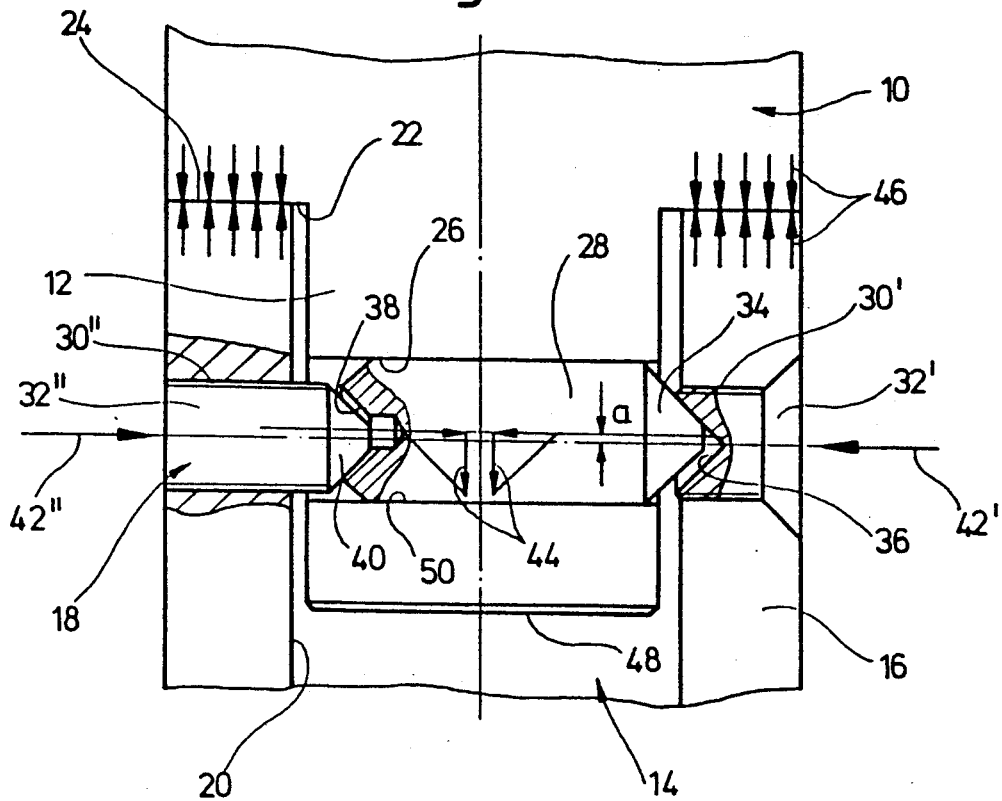
FIG. 1 is a longitudinal cross-sectional view of a connecting device having a one-piece tightening bolt in the tightened state.

The connecting device illustrated in the drawings is used both to releasably couple tools to a machine spindle and to also connect tool parts with one another. The term "tool parts" used above and hereinafter refers to structural parts containing either a fitting pin or a connecting sleeve having a mating bore, thus in particular tool heads, tool shanks, extending and reducing parts, adjusting heads, spindle-attachment flanges and, if desired, the machine spindle itself.

Figure 2:
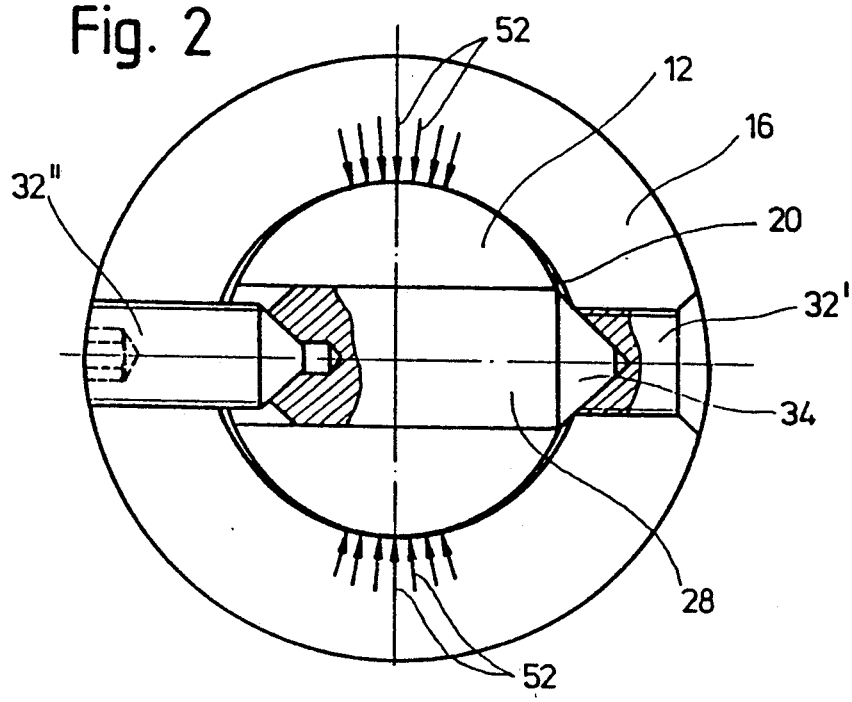
FIG. 2 is a cross-sectional view of the connecting device according to FIG. 1.

The connecting device shown in FIGS. 1 and 2 consists substantially of a fitting pin 12 axially projecting from a first tool part 10, a receiving sleeve 16 axially projecting from a second tool part 14 and a tightening mechanism 18 to pull the fitting pin 12 into the mating bore 20 of the receiving sleeve 16 and to produce a planar surface to planar surface tightening between the planar and annular end face 22 of the first tool part 10, which annular end face surrounds the fitting pin, and the planar and ringlike end face 24 of the second tool part 14. The tightening mechanism 18 includes a tightening bolt 28 movably arranged in a crossbore 26 in the fitting pin 12 and two retaining screws 32', 32" threadedly guided in coaxial and internally threaded openings 30', 30" in the receiving sleeve 16 and positioned diametrically opposite one another. The tightening bolt 28 has at one end an external cone 34 which extends into an internal cone 36 of the adjacent retaining screw 32' and has at its other end opposite the external cone 34 an internal cone 38 which receives therein an external cone 40 formed on the retaining screw 32".

To create the connection between the two tool parts 10 and 14, the fitting pin 12 is, with the retaining screw 32" being unscrewed, first loosely guided into the mating bore 20 of the receiving sleeve 16 until the planar end faces 22, 24 abut. During the subsequent screwing in of the retaining screw 32" into the internally threaded opening 30", the retaining screw 32" and the tightening bolt 28 contact one another in the area of the cone surfaces 38, 40 which face one another. During the further course of the tightening operation, the tightening bolt 28 with its external cone 34 is moved into the internal cone 36. The actual tightening operation starts at this point, at which time the contact tightening forces 42", 42' introduced by the retaining screws 32", 32' are converted by the conical surfaces, due to the displacement or misalignment of the axes of the coaxial threaded openings and the tightening bolt, into an axial force 44 pulling the fitting pin 12 into the mating bore 20. The axial force 44 results in a planar surface to planar surface tightening between the annular end face 22 of the first tool part and the end face 24 of the second tool part 14. The axially directed tightening force 44 is thereby transmitted through the tightening bolt 28 onto the region of the base or surface 50 of the crossbore 26 extending through the fitting pin, which base 50 faces in the opposite direction from the end 48 of the fitting pin, and onto the fitting pin 12 and thus onto the first tool part 10. On the other hand, the tightening forces must be applied and removed in the area of the retaining screws through the respective internally threaded openings 30', 30" within the wall of the receiving sleeve 16. Due to a coordinated selection of the sleeve wall thickness, the sleeve material and the tightening force introduced by the screws 32' and 32", the torques can be utilized to create a specific elastic deformation of the connecting sleeve 16, thereby resulting in an elongation of the mating bore 20 in direction of the tightening bolt and in a corresponding cross-section reduction transversely thereto (FIG. 2) The elastic deformations taking place are in the micron (μ) range and are illustrated in an exaggerated form for illustrative purposes in FIGS. 1 and 2. The internal surface of the mating bore is, due to the reduction in diameter in a direction transversely to the axis of the tightening bolt 28, pressed on diametrically opposed sides against the surface of the fitting pin, bridging the fitting clearance, which as a rule is some microns ($\mu$'s) The fitting pin is thereby clamped from two sides, due to the opposing forces represented by the arrows 52, into the mating bore. Since, on the other hand, the tightening bolt 28 is freely movable in the crossbore 26 of the fitting pin 12 and is wedged between the retaining screws 32', 32" rigidly arranged in the connecting sleeve 16, a self-centering four-point contact in the area of the fitting pin 12 and of the mating bore 20 is obtained.

Figure 3:
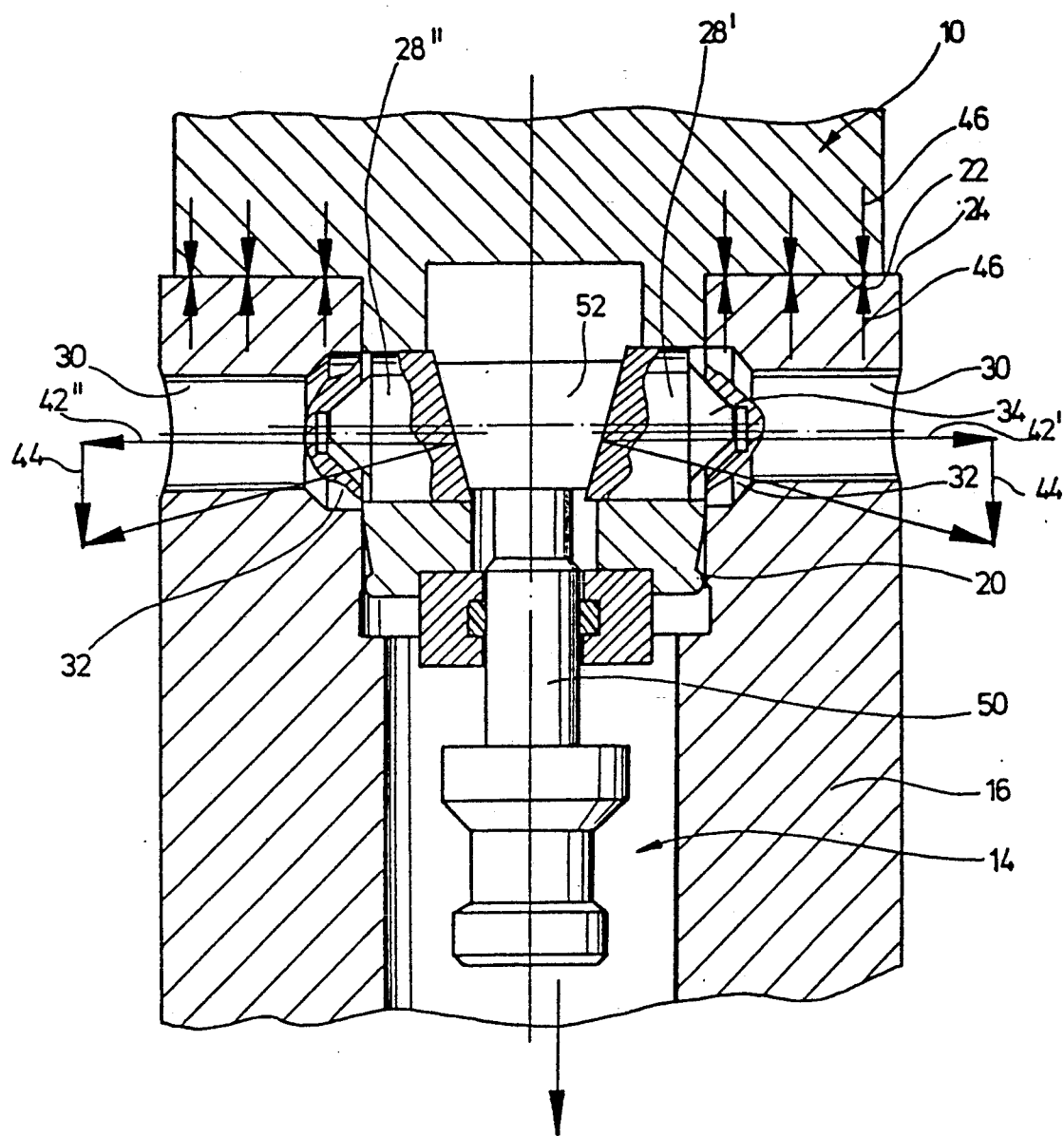
FIG. 3 is a longitudinal cross-sectional view of a connecting device having a two-part tightening bolt in the tightened state.

The exemplary embodiment designed as a spindle connection and illustrated in FIG. 3 differs from the exemplary embodiment according to FIGS. 1 and 2 by the tightening bolt 28 being divided two parts 28', 28" which lie at diametrically opposite ends of the crossbore 26 and by the tightening operation being able to be started by a sliding cam 52 acting against inner and oppositely facing cam surfaces on the tightening bolts 28', 28", which sliding cam 52 is axially movable caused by an axial movement of a pull rod 50. The retaining screws 32 having an internal cone 36 are screwed into their respective openings from the inside of the mating bore 20 into the internally threaded openings 30 of the receiving sleeve 16 and form a receiving means for the external cones 34 on the tightening bolts 28', 28". The tightening operation results in a transfer of force, corresponding with FIGS. 1 and 2, onto the tool parts 10, 14 to be connected with one another so that reference in this regard is made to the above discussions.

Figure 4:
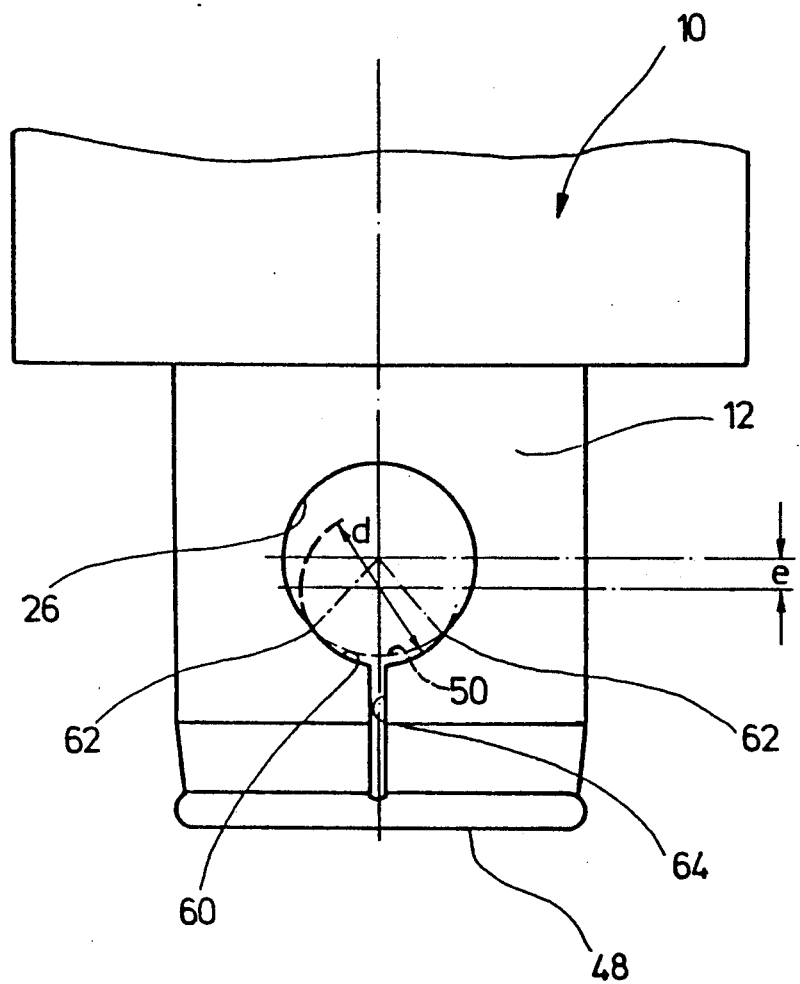
FIG. 4 is a side view of a tool part having a crossbore in the fitting pin, which crossbore is modified according to the invention.
Figure 5:
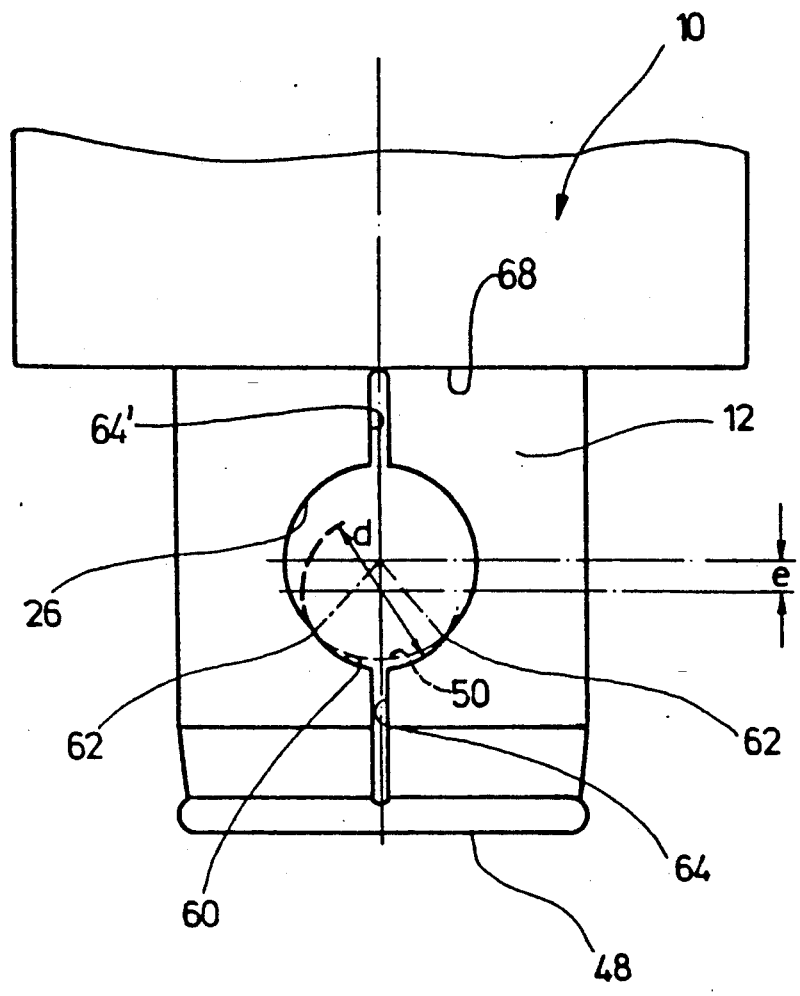
FIG. 5 is a side view corresponding to FIG. 4 of a modified exemplary embodiment.

The exemplary embodiments of a tool parr 10 illustrated in FIGS. 4 and 5 have taken additional precautions which, independent from the above-described measures or in connection with these, result also in a self-centering four-point contact between the fitting pin 12 and the mating bore 20. The crossbore 26 for receiving the tightening bolt 28 has for this purpose in its base surface facing oppositely from the end 48 of the pin, a recess 60 which causes the fitting pin 28, not illustrated in FIGS. 4 and 5, to be pressed under the action of the pull-in force 44 not at the lowermost portion thereof against the base surface 50, but on opposite and laterally outwardly located edges 62 of the recess 60. Thus, the force 44 is divided in the area of the two edge locations 62 into an axially directed force component and a radially directed force component, with the radial force component resulting in a radial elastic bulge in the fitting pin 12, which bulge is directed transversely to the tightening bolt 28. The recess 60 in the illustrated exemplary embodiment is formed by an arcuate surface having a smaller diameter than the crossbore 26, which arcuate surface is eccentrically offset with respect to the crossbore 26 by the dimension e in direction of the pin end 48. However, the recess 60 does not need to be round, thus can also be produced in a different manner. Important is only that an open space is provided in the region of the base surface 50, which open space is bridged contact-free by the tightening bolt 28.

The bulge of the fitting pin 12 can be enhanced by a notch 64, 64' extending from the base surface of the bore toward the end 48 of the pin and/or to the door 68 (FIG. 5) of the pin. The notch 64 can thereby be designed either as a groove (FIG. 4) or as a through slot. To avoid dirt from accumulating in the notches 64, 64', they can be filled with an elastomer material.

Figure 6:
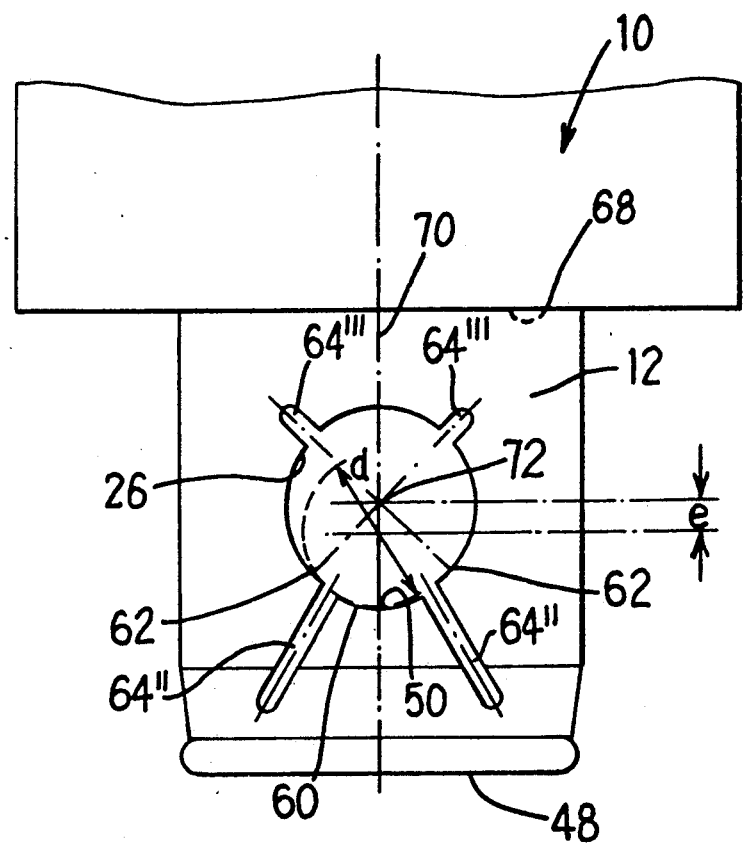
FIG. 6 is a side view corresponding to FIGS. 4 and 5 of a further modified exemplary embodiment of the invention.

A further improvement in the structure for effecting an elastic radial deformation of the fitting pin 12 can be achieved in the exemplary embodiment illustrated in FIG. 6 by providing several notches 64", $\Gamma'''$ arranged at an angular distance from on anohter and being substantially radial in their extent with respect to the central axis of the crossbore 26. The notches 64" or 64''' are arranged in pairs and symmetrically in a mirror image manner on opposite sides of a plane defined by the longitudinal axis 70 of the fitting pin 12 and the central axis 72 of the crossbore 26, with the notches 64" extending inclined toward the end 48 of the fitting pin and are longer or deeper than the notches 64''' which extend inclined toward the root 68 of the fitting pin. The edge lines 62 of the recess 60, against which the tightening bolt 28 is pressed while spreading open or elastically deforming the fitting pin 12, are located outside of the two notches 64".

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for connecting two tool parts having a common axis, in particular an axis of rotation, comprising a fitting pin axially projecting from the first tool part, comprising an annular end face surrounding the fitting pin at its root, comprising a connecting sleeve axially projecting from the second tool part and which has a mating bore to receive the fitting pin and a ringlike end face which can be pressed against the annular end face, comprising a tightening bolt movable in a crossbore of the fitting pin and having an internal or external cone or a sloped cam surface at its ends, and comprising two retaining screws guided in diametrically opposed internally threaded openings in the connecting sleeve, having an external or internal cone or a sloped cam extending toward the inside of the sleeve and complementary to the internal or external cone or the sloped cam surface of the tightening operation with the tightening bolt, the tightening bolt and the retaining screws being offset or misaligned so as to cause during the tightening operation the pulling of the fitting pin into the mating bore and the mutual pressing of the annular end face and of the ringlike end face together, the improvement wherein the fitting pin has at least one notch extending over the length of the crossbore and being open toward the inside of the crossbore to enhance deformation of the fitting during the tightening operation.

2. In a device for connecting two tool parts having a common axis, in particular an axis of rotation, comprising a fitting pin axially projecting from the first tool part, comprising an annular end face surrounding the fitting pin at its root, comprising a connecting sleeve axially projecting from the second tool part and which has a mating bore to receive the fitting pin and a ringlike end face which can be pressed against the annular end face, comprising a tightening bolt movable in a crossbore of the fitting pin and having an internal or external cone or a sloped cam surface at its ends, and comprising two retaining screws guided in diametrically opposed internally threaded openings in the connecting sleeve, having an external or internal cone or a sloped cam extending toward the inside of the sleeve and complementary to the internal or external cone or the sloped cam surface of the tightening bolt, which cone or cam surfaces are wedged, during the tightening operation with the tightening bolt, the tightening bolt and the retaining screws being offset or misaligned so as to cause during the tightening operation the pulling of the fitting pin into the mating bore and the mutual pressing of the annular end face and of the ringlike end face together, the improvement wherein the tightening bolt and cross bore are dimensioned so that the crossbore provided in the fitting pin has in the area of its base surface facing away from the end of the pin a recess extending over the length of the crossbore and forming a contact surface for the wedged-in tightening bolt along its longitudinal edges.

3. The device according to claim 2, wherein the recess is formed by a bore surface which is eccentrically displaced with respect to the crossbore in direction of the end of the pin, and which bore has a diameter which is smaller compared with the crossbore.

4. The device according to claim 2, wherein the recess is formed by an oval deformation of the crossbore, which oval deformation is elongated toward the end of the pin.

5. The device according to claim 2, wherein the longitudinal edges of the recess around the crossbore axis define an angle of ±40 to ±50 with respect to the sides of the base surface of the bore.

6. The device according to claim 2, wherein the fitting pin has at least one notch extending over the length of the crossbore and being open toward the inside of the crossbore.

7. The device according to claim 6, wherein the notch is arranged in the area of the base surface of the crossbore, which base surface faces away from the free end of the pin.

8. A device according to claim 6, wherein the notch is arranged in the area of the base surface of the crossbore, which base surface faces away from the root of the pin.

9. The device according to claim 7, wherein the depth of the notch is a multiple of the wall thickness between the base of the notch and the end of the pin.

10. The device according to claim 7, wherein the notch is constructed as a slot going through to the end of the pin.

11. The device according to claim 6, wherein the notch is filled with an elastomer material.

12. The device according to claim 1, wherein several notches are arranged at an angular distance from one another and extend substantially radially with respect to the crossbore.

13. The device according to claim 6, wherein several notches are arranged at an angular distance from one another and extend substantially radially with respect to the crossbore.

14. The device according to claim 6, wherein notches are provided, two extending inclined toward a free end of the fitting pin and two extending inclined toward a root of the fitting pin, which notches are arranged in pairs oriented on opposite sides of a plane defined by a longitudinal axis of the fitting pin and a central axis of the crossbore.

15. The device according to claim 14, wherein the two notches extending toward the free end of the fitting pin are longer than the notches extending toward the root of the fitting pin.

16. The device according to claim 1, wherein notches are provided, two extending inclined toward a free end of the fitting pin and two extending inclined toward a root of the fitting pin, which notches are arranged in pairs oriented on opposite sides of a plane defined by a longitudinal axis of the fitting pin and a central axis of the crossbore.

17. The device according to claim 16, wherein the two notches extending toward the free end of the fitting pin are longer than the notches extending toward the root of the fitting pin.

18. The device according to claim 14, wherein the two notches extending inclined toward the free end of the fitting pin also extend into the crossbore in the region of the recess.

* * * * *

UNITED STATES PATENT AND TRADEMARK OFFICE
CERTIFICATE OF CORRECTION

PATENT NO. : 5 137 401
DATED : August 11, 1992
INVENTOR(S) : Werner Muendlein

It is certified that error appears in the above-identified patent and that said Letters Patent is hereby corrected as shown below:

Column 6, Line 44; after "tightening" add ---bolt, which cone or cam surfaces are wedged, during the tightening---.

Column 6, Line 53; after "fitting" add ---pin---.

Signed and Sealed this

Fifth Day of October, 1993

Attest:

BRUCE LEHMAN

Attesting Officer

Commissioner of Patents and Trademarks